United States Patent
Delplanque et al.

(10) Patent No.: US 10,920,678 B2
(45) Date of Patent: Feb. 16, 2021

(54) VALVE AND EXHAUST SYSTEM COMPRISING SUCH A VALVE

(71) Applicant: FAURECIA SYSTEMES D'ECHAPPEMENT, Nanterre (FR)

(72) Inventors: Gilbert Delplanque, Sochaux (FR); Raphael De Matos, Saone (FR); Alain Mercier, Nommay (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/604,393

(22) PCT Filed: Apr. 11, 2017

(86) PCT No.: PCT/FR2017/050874
§ 371 (c)(1),
(2) Date: Jan. 28, 2020

(87) PCT Pub. No.: WO2018/189429
PCT Pub. Date: Oct. 18, 2018

(65) Prior Publication Data
US 2020/0284209 A1    Sep. 10, 2020

(51) Int. Cl.
*F02D 9/04*    (2006.01)
*F02D 9/10*    (2006.01)
(Continued)

(52) U.S. Cl.
CPC ............. *F02D 9/04* (2013.01); *F02D 9/1035* (2013.01); *F02D 9/1075* (2013.01); *F16K 1/221* (2013.01);
(Continued)

(58) Field of Classification Search
CPC ........ F02D 9/04; F02D 9/1075; F02D 9/1035; F02D 2009/0261; F16K 49/005; F16K 1/221; F01N 2260/20
See application file for complete search history.

(56) References Cited

U.S. PATENT DOCUMENTS 3,693,935 A * 9/1972 Thauer ...................... F02D 9/04
                                                251/305
5,148,678 A * 9/1992 Ueda ........................ F02B 37/22
                                                137/338
(Continued)

FOREIGN PATENT DOCUMENTS

DE    2422519 A1    11/1975
FR    2912779 A1    8/2008
(Continued)

OTHER PUBLICATIONS

200714 WO 2010 103249 Greber machine translation.*
(Continued)

*Primary Examiner* — Carl C Staubach
(74) *Attorney, Agent, or Firm* — Carlson, Gaskey & Olds, P.C.

(57) ABSTRACT

A valve comprises a body having a gas inlet and outlet, a flap in the body,—a drive shaft which is rigidly connected to the flap, an actuator having a motor shaft, and a coupling of the motor shaft and the drive shaft. A mounting for the actuator on the body comprises a side wall defining a cavity and closed in part at angular sectors facing towards the inlet and towards the outlet. The wall has openings for circulating air between the inside and the outside of the cavity. A thermally insulating partition is between the body and the actuator and has a surface area which is greater than 50% of a cross section of the wall taken in a plane which is perpendicular to the axis of the shaft, and has an opening for receiving the
(Continued)

shaft with a gap. A plate is connected to the shaft, which is axially interposed between the partition and the actuator, and covers the gap.

19 Claims, 4 Drawing Sheets

(51) Int. Cl.
    *F16K 1/22*     (2006.01)
    *F16K 49/00*     (2006.01)
    *F02D 9/02*     (2006.01)

(52) U.S. Cl.
    CPC ........ F16K 49/005 (2013.01); *F01N 2260/20* (2013.01); *F02D 2009/0261* (2013.01)

(56) References Cited

U.S. PATENT DOCUMENTS

| | | | |
|---|---|---|---|
| 7,401,592 B2* | 7/2008 | Willats | F01N 13/08 123/323 |
| 7,802,424 B2* | 9/2010 | Kanzawa | F02D 9/106 60/324 |
| 10,060,360 B2* | 8/2018 | Delplanque | F16K 31/043 |
| 2007/0131889 A1* | 6/2007 | Unbehaun | F02D 9/04 251/305 |
| 2010/0071642 A1* | 3/2010 | Kubota | F02D 9/04 123/90.11 |
| 2017/0074136 A1* | 3/2017 | Knoll | F01N 1/24 |
| 2018/0010707 A1* | 1/2018 | Kienle | F16K 31/041 |
| 2018/0051611 A1* | 2/2018 | Hwang | F01N 1/18 |
| 2018/0238209 A1* | 8/2018 | Suzuki | F16K 1/221 |
| 2019/0390581 A1* | 12/2019 | Mercier | F16L 55/027 |
| 2020/0049079 A1* | 2/2020 | Lee | F02D 9/04 |
| 2020/0088113 A1* | 3/2020 | Delplanque | F02D 9/1005 |

FOREIGN PATENT DOCUMENTS

| | | |
|---|---|---|
| WO | 2010103249 A1 | 9/2010 |
| WO | 2018189429 A1 | 10/2018 |

OTHER PUBLICATIONS

International Search Report and Written Opinion for International Application No. PCT/FR2017/050874 filed Apr. 11, 2017.

* cited by examiner

VALVE AND EXHAUST SYSTEM COMPRISING SUCH A VALVE

CROSS-REFERENCE TO RELATED APPLICATIONS

This application is the US national phase of PCT/FR2017/050874, 11 Apr. 2017.

FIELD OF INVENTION

The invention generally relates to valves for exhaust lines.

BACKGROUND OF THE INVENTION

EP 2,180,167 describes a valve for an exhaust line in which the flap is rotated by an electric actuator. The coupling between the drive shaft of the flap and the motor shaft is placed inside a shell, the bottom of which is fastened directly to the guide bearing of the drive shaft. Such a valve cannot be used on the exhaust line of a gasoline heat engine whereof the gases reach temperatures exceeding 800° C.

Indeed, the heat energy of the exhaust gases is transmitted to the guide bearing by the drive shaft, and from the guide bearing to the shell surrounding the coupling. The temperature in the inner volume of the shell can reach high values. There is a significant risk of the actuator being damaged.

SUMMARY OF THE INVENTION

In this context, the invention aims to propose a valve that can be used on such an exhaust line of a vehicle with a gasoline heat engine.

For this purpose, the invention concerns a valve for an exhaust line, the valve comprising:
- a valve body having an exhaust gas inlet and an exhaust gas outlet;
- a flap arranged in the valve body;
- a drive shaft secured to the flap, rotating relative to the valve body around a rotation axis;
- an actuator having a motor shaft;
- a coupling, which couples the motor shaft and the drive shaft in rotation;
- a mounting for the actuator on the valve body, including a side wall with a closed contour extending around the rotation axis and inwardly defining a cavity, the side wall being at least partially closed along angular sectors facing towards the exhaust gas inlet and towards the exhaust gas outlet, the side wall having at least one, preferably at least two, openings for circulating air between the inside and the outside of the cavity;
- at least one thermally insulating partition, axially inserted between the valve body and the actuator, the thermally insulating partition having a surface greater than 50% of a section of the side wall considered in a plane perpendicular to the rotation axis, the thermally insulating partition having an opening in which the drive shaft is engaged, with a gap separating the drive shaft from one edge of the opening;
- a plate connected to the drive shaft, which is axially interposed between the thermally insulating partition and the actuator, and covers the gap.

Thus, the valve includes a set of arrangements which, considered together, make it possible to keep the cavity at a moderate temperature, even when the exhaust gases are at temperatures exceeding 800° C. The motor shaft, the coupling, and all of the members located near the motor shaft, in particular the sealing gasket of the motor shaft, are protected from the heat.

This result is obtained on the one hand because the side wall of the mounting forms a screen with respect to the thermal radiation coming from the exhaust gas inlet and the exhaust gas outlet. Indeed, the inlet and the outlet are connected to particularly emissive ducts.

Furthermore, the openings arranged in the side wall make it possible to circulate air between the inside and the outside of the cavity. This prevents an inner circulation of hot air from being created inside the cavity, contributing to heating the motor shaft by convection.

The insulating thermal partition makes it possible to protect the motor shaft, and the other equipment located in the cavity, from the propagation of heat from the valve body. The thermally insulating partition serves as a screen with respect to the thermal radiation, and also prevents the transmission of heat by convection from the valve body toward the inside of the cavity. It also serves as a heat screen with respect to the radiation emitted by the parts of the side wall directly fastened on the valve body.

The gap separating the drive shaft from the edge of the opening causes there to be no propagation of heat by conduction from the drive shaft towards the thermally insulating partition and the side wall. The plate connected to the drive shaft and covering the gap limits the convection from the outside of the cavity towards the inside of the cavity through the gap. This plate also serves as a screen with respect to the thermal radiation of the valve body and serves as a heat sink, making it possible to discharge the heat transmitted by conduction along the drive shaft. The air circulation coming from the outside of the cavity favors the discharge of the heat dissipated by the plate.

This set of elements makes it possible to keep the motor shaft at a temperature compatible with the proper operation of the actuator. Typically, the motor shaft is kept at a temperature below 160° C.

The valve may also have one or more of the following characteristics, considered individually or in all technically possible combinations:
- The actuator is situated at one axial end of the side wall, the drive shaft being positioned in the cavity.
- The insulating partition and/or the plate is situated in the cavity.
- The thermally insulating partition is substantially perpendicular to the rotation axis.
- The thermally insulating partition comprises a metal outer enclosure and a layer of a fibrous material positioned inside the outer enclosure.
- The valve includes a guide bearing of the drive shaft, engaged in the opening of the thermally insulating partition, the gap separating the bearing from the edge of the opening.
- The drive shaft includes an end part protruding axially in the cavity past the bearing, the valve including a deflector with a bottom fastened to the end part and a skirt extending from the bottom towards the valve body, the skirt surrounding the bearing and being engaged in the gap.
- The deflector comprises a collar extending the skirt and forming a heat screen between the valve body and the thermally insulating partition.
- The valve includes at least one additional plate, positioned in the cavity and extending substantially parallel to the plate.

At least one crown is formed in the side wall, said crown being engaged between the plate and the additional plate.

The valve includes at least one additional insulating partition housed in the cavity, interposed axially between the coupling and the actuator.

The valve includes a layer of a thermally insulating material, extending over the valve body to the inside of the cavity.

The valve includes a layer of a thermally insulating material completely filling a volume of the cavity between the insulating partition and the valve body.

The valve includes at least one air blower or air extractor, connected to one of the openings of the side wall.

According to a second aspect, the invention relates to a vehicle exhaust line, including a valve having the above features.

BRIEF DESCRIPTION OF THE DRAWINGS

Other features and advantages of the invention will emerge from the detailed description given below, by way of indication and without limitation, with reference to the annexed figures, including.

DETAILED DESCRIPTION

Figure 1:
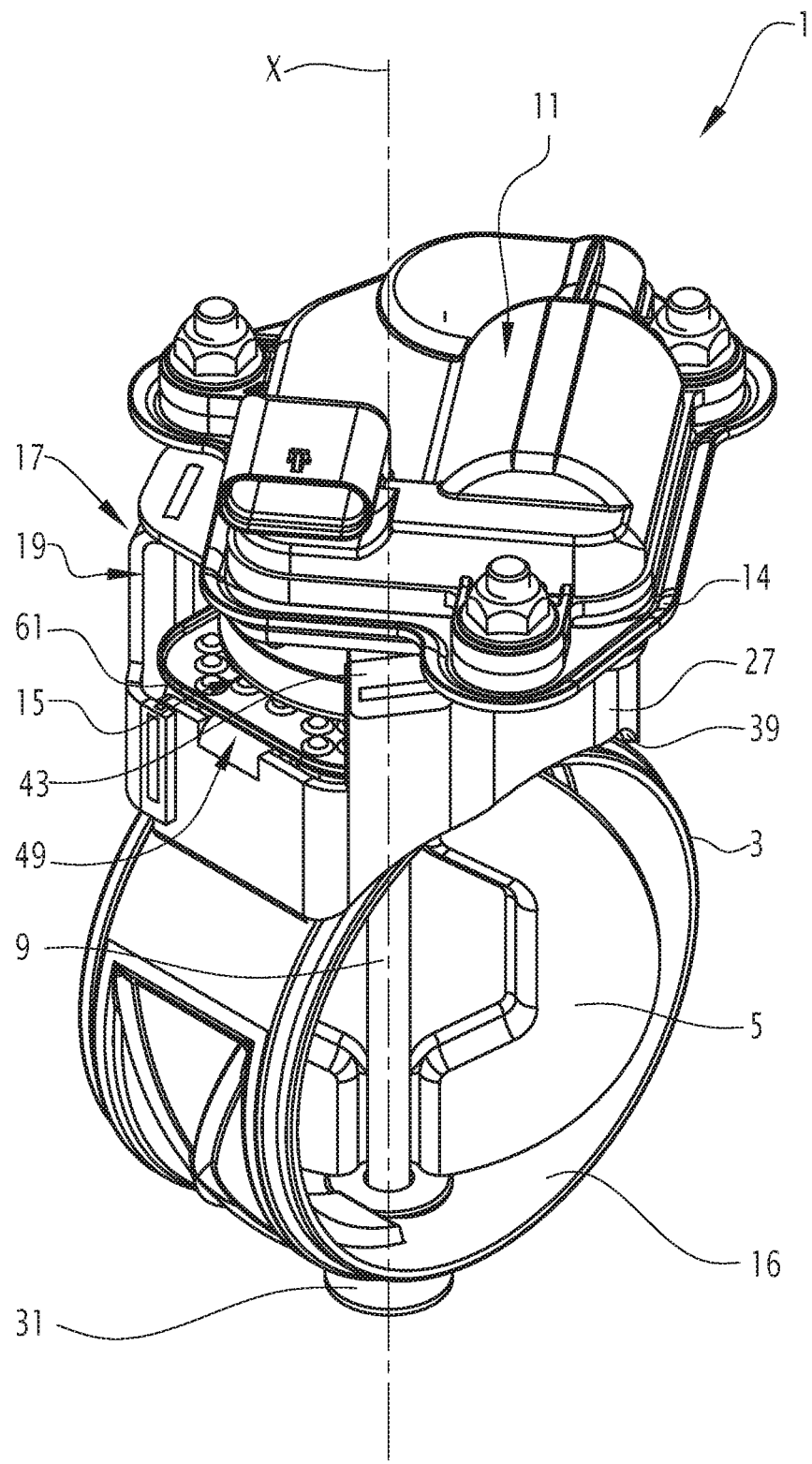
FIG. 1 is a perspective view of the valve according to the invention.
Figure 2:
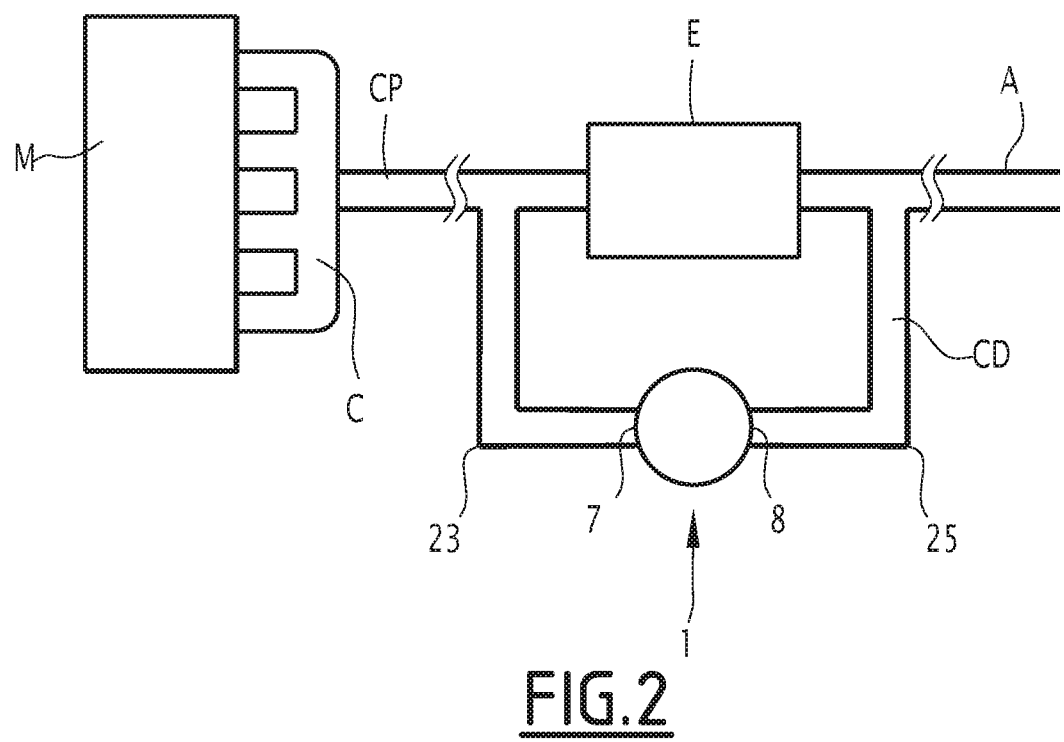
FIG. 2 is a simplified view of an exhaust line equipped with the valve according to the invention.

The valve 1 shown in FIG. 1 is intended to be inserted typically on a vehicle exhaust line 2, as illustrated in FIG. 2. This vehicle is for example a motor vehicle, in particular a car or truck.

The valve 1 is particularly suitable for vehicles equipped with a so-called gasoline engine, but can also be used on vehicles with a diesel engine.

For vehicles equipped with gasoline engines, the exhaust gases are generally at a higher temperature than for a diesel engine. For a gasoline engine, the exhaust gases frequently reach temperatures above 800° C., whereas in diesel engines, the exhaust gases typically have temperatures of between 600 and 750° C.

Furthermore, depending on the position of the valve on the exhaust line, the temperatures of the exhaust gases passing through the valve can vary from 90° C. at the catalyst outlet to 600° C. at the exhaust line outlet.

The exhaust line 2 includes a manifold M collecting the exhaust gases leaving the combustion chambers of the engine M, a cannula A by which the purified exhaust gases are released into the atmosphere, and a main duct CP fluidly connecting the manifold M to the cannula A.

The exhaust line 2 generally comprises at least one duct CD mounted on a bypass on the main duct CP. The valve 1 is mounted on the main duct CP or on the bypass duct CD, or on a piece of equipment of the exhaust line such as a muffler.

The valve 1 preferably performs one of the functions below:

improving the acoustics of the vehicle by opening or closing, partially or fully, a duct of the exhaust line, based on the duty point of the engine;

improving the emissions of pollutants, in particular nitrogen oxides, by adjusting the back pressure in the exhaust line, so as to regulate the recirculation rate of the exhaust gases in the engine;

orienting the exhaust gases selectively inside or outside an energy recovery member, for example a heat exchanger;

orienting the exhaust gases selectively inside or outside and exhaust gas pollution control member.

In the exemplary embodiment of FIG. 2, the valve 1 is mounted on a bypass duct CD selectively making it possible to bypass a heat exchanger E.

In a variant, the valve 1 is mounted on the main duct CP and the heat exchanger E on the bypass duct CD.

According to another alternative, the valve 1 is mounted on the main duct CP, and a noise reduction member or a pollution control member is mounted on the bypass duct CD.

The valve 1 comprises a valve body 3 and a flap 5 positioned in the valve body 3 (FIG. 1). The valve body 3 has an exhaust gas inlet 7, and an exhaust gas outlet 8, which are visible in FIG. 2. The exhaust gases pass through the valve body 3, while circulating from the inlet 7 toward the outlet 8.

The valve 1 further includes a drive shaft 9 secured to the flap 5. The drive shaft 9 is rotatable, with the flap 5, with respect to the valve body 3 around a rotation axis X shown in FIG. 1.

Furthermore, the valve 1 includes an actuator 11 having a motor shaft 13, and a coupling 15 that rotatably couples the motor shaft 13 and the drive shaft 9.

Typically, the motor shaft 13 is aligned with the drive shaft 9. In a variant, the motor shaft 13 is off-centered relative to the drive shaft 9 or inclined relative thereto.

The actuator 11 is of any suitable type. Typically it is a gear motor, preferably an electric gear motor.

The actuator 11 includes an external housing 14, the motor shaft 13 protruding outside the external housing 14.

The valve body 3 has all sorts of shapes. For example, it is cylindrical, with a circular section, as shown in the figures.

The valve 1 is, for example, an on-off valve. In this case, the flap 5 is able to adopt a first extreme position in which the flap 5 prohibits the circulation of the exhaust gases through the valve body 3, and a second extreme position in which the circulation of the exhaust gases through the valve body 3 is allowed.

In a variant, the valve is of the adjustable type, the flap being able to adopt a plurality of positions partway between the first and second extreme positions. Each intermediate position corresponds to a degree of partial opening, making it possible to vary the passage section offered to the exhaust gases traveling through the valve body 3.

Typically, the flap 5 abuts against a seat or a stop in one or both extreme positions. A stop 16 is shown in the figures.

The flap 5 is arranged in any way possible on the drive shaft 9. For example, the valve 1 is of the butterfly type, the flap 5 being fastened to the drive shaft 9 along a median line of the flap (see FIG. 1). In a variant, the valve is of the gate type, the flap being fastened to the drive shaft 9 along an edge of said flap.

The valve 1 further includes a mounting 17 of the actuator 11 on the valve body 3. The mounting 17 includes a side wall 19 with a closed contour, extending around the rotation axis X and inwardly defining a cavity 21.

The side wall 19 thus surrounds the rotation axis X over its entire periphery.

Typically, the rotation axis X makes up the central axis of the cavity 21.

The side wall 19 can have all types of shapes.

Considered in section perpendicular to the rotation axis X, the side wall 19, for example, has a rectangular shape, typically square as illustrated in the figures.

In a variant, the wall 19 has a circular section or with any other shape.

The side wall 19 has been formed from several metal parts, attached on one another. For example, each side of the side wall is made up of a metal plate, as illustrated in the figures. In a variant, the side wall is integrally formed.

Advantageously, the side wall 19 is at least partially closed along angular sectors 27, 29 respectively turned toward the exhaust gas inlet 7 and toward the exhaust gas outlet 8.

Indeed, as illustrated in FIG. 2, the exhaust gas inlet 7 and outlet 8 are respectively connected to inlet and outlet ducts 23, 25 in which exhaust gases circulate. The angular sectors 27 and 29 form screens against the thermal radiation emitted by the ducts 23 and 25.

Figure 6:
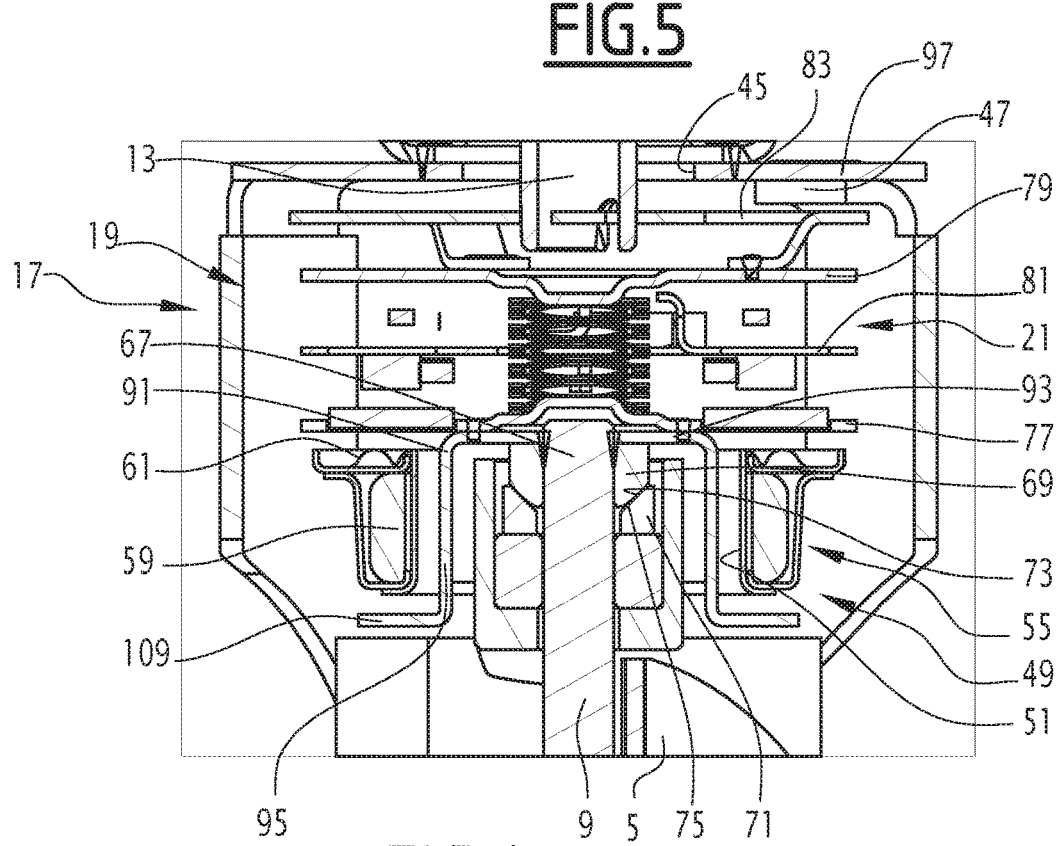

The angular sector 27 is visible in FIGS. 1 and 6. The angular sector 29 is visible only in FIG. 4.

The angular width of each sector depends on the size of the inlet or outlet duct. For example, each sector extends around the axis X over an angle of between 45° and 135°, preferably between 60° and 120°, more preferably between 80° and 100°, and still more preferably an angle of 90°. In the example shown in FIGS. 1 to 5, each angular sector 27, 29 corresponds to one side of the rectangular side wall 19.

The side wall 19 at said angular sectors 27, 29 is preferably completely closed. Thus, it extends practically from the valve body 3 to the external housing 14 of the actuator, without opening. In a variant, the side wall 19 of the angular sectors 27, 29 is indented towards the valve body 3, as illustrated in FIG. 1, or towards the actuator, or further includes one or several openings in the middle of the wall.

Furthermore, the side wall 19 advantageously includes at least one, preferably at least two openings 35, 37 allowing air to be circulated between the inside and the outside of the cavity 21. The size and the position of each opening are determined on a case-by-case basis.

For example, the two openings 35, 37 are advantageously arranged diametrically opposite relative to the rotation axis X.

The openings 35, 37 are arranged in any appropriate manner. These are for example openings with a closed contour arranged at a distance from the edges of the side wall 19. In a variant, these are indentations cut into an edge of the side wall 19.

Preferably, the openings 35, 37 are arranged in angular sectors of the side wall 19 that do not face the exhaust gas inlet 7 or outlet 8.

Figure 3:
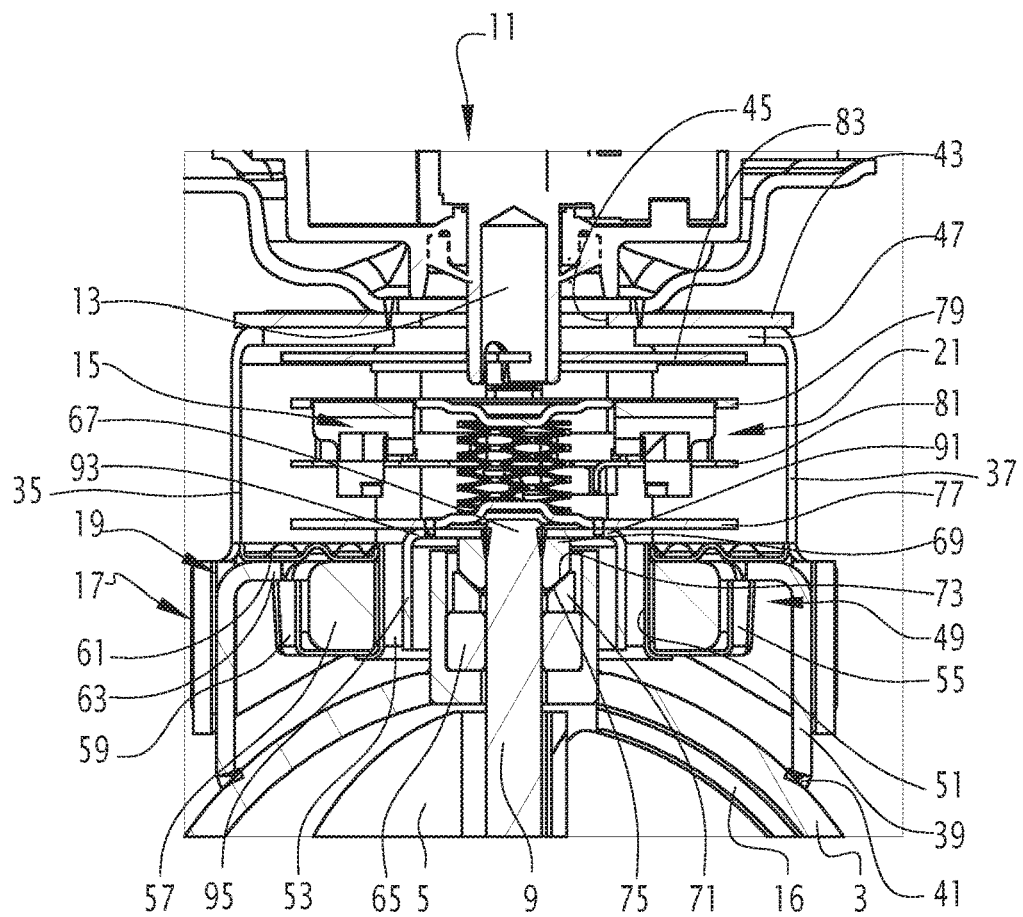
FIG. 3 is a partial sectional view of the valve of FIG. 1, the section being taken in a plane containing the drive shaft.

One edge 39 of the side wall is directly fastened to the valve body 3, typically by one or several weld lines 41 (FIG. 3). At its opposite axial end, the side wall 19 is rigidly fastened to a cover 43, which in turn is, for example, welded on the external housing 14 of the actuator 11.

The cover 43 is typically a plate perpendicular to the rotation axis X. It has a central opening 45, passed through by the motor shaft 13. The side wall 19 is fastened to the cover 43 by tabs 47.

The motor shaft 13 is thus arranged inside the cavity 21.

The valve 1 further includes a thermally insulating partition 49, interposed axially between the valve body 3 and the actuator 11.

The thermally insulating partition 49 has an opening 51 in which the drive shaft 9 is engaged. A gap 53 separates the drive shaft 9 from the edge of the opening 51.

The thermally insulating partition 49 is, for example, rigidly fastened to the mounting 17, and more specifically to the side wall 19.

In a variant, the thermally insulating partition 49 is rigidly fastened to the valve body 3, and more particularly on a pin guide.

It is placed inside the cavity 21. It extends substantially perpendicular to the rotation axis X, i.e., to the drive shaft 9. This means that it has, in a plane perpendicular to the rotation axis X, dimensions much larger than its thickness along the rotation axis X.

Advantageously, the thermally insulating partition 49 has a surface greater than 50% of an inner section of the side wall 19, taken in a plane perpendicular to the rotation axis X. Preferably, its surface is greater than 70%, still more preferably than 90% and still more preferably than 95% of the inner section of the side wall. Thus, it emerges practically completely from the cavity 21, midway between the actuator 11 and the valve body 3. It should be noted that one considers, in order to evaluate the thermally insulating partition 49, both the solid zones of said partition and the hollow zones, i.e., the opening 51.

The thermally insulating partition 49 includes a metal outer enclosure 55, and a layer 57 of a fibrous material positioned inside the outer enclosure 55.

The metal outer enclosure 55 is, for example, made from stainless steel. It is hollow, and inwardly receives the fibrous metal layer 57.

The metal outer enclosure 55, for example, includes a concave lower bottom 59 and a substantially flat upper bottom 61 rigidly fastened to the concave lower bottom 59. The layer of fibrous material 57 is placed in the concave lower bottom 59.

The thermally insulating partition 49 is rigidly fastened to tabs 63 cut from the side wall 19 and bent toward the inside of the cavity.

Typically, the upper bottom 61 is welded on the tabs 63, or fastened by any other suitable means.

The layer of fibrous material typically includes glass fibers or ceramic fibers, which are kept together preferably by weaving, needling or a binder.

The valve 1 advantageously includes a guide bearing 65 of the drive shaft 9, engaged in the opening 51 of the thermally insulating partition. The drive shaft 9 has an end part 67 engaged in the bearing 65 and protruding axially into the cavity 21 past the bearing 65.

Advantageously, the valve 1 includes another bearing 31, arranged to guide the other end of the drive shaft 9 (FIG. 1).

The valve 1 includes a sealing member 69, rigidly fastened to the end part 67 of the shaft. The sealing member 69 cooperates with the additional sealing member 71 to prevent the exhaust gases from leaving the valve body by passing between the drive shaft 9 and the bearing 65. The complementary sealing member 71 belongs to the bearing 65 or is attached thereon. The sealing member 69 has a sealing step 73 bearing slidably against a complementary sealing step 75 formed on the member 71. The steps 73 and 75 completely surround the drive shaft 9 and are urged axially against one another by resilient members that are generally integrated into the coupling 15.

Thus, the gap 53 is defined radially outwardly by the edge of the opening 51 and radially inwardly by the bearing 65. There is no contact between the bearing 65 and the thermally insulating partition 49.

Furthermore, the valve 1 includes a plate 77, connected to the drive shaft 9, axially inserted between the thermally insulating partition 49 and the actuator 11.

The plate 77 covers the gap 53.

This means that, considered projected axially over the thermally insulating partition 49, the plate 77 extends over the entire surface of the gap 53, but also very much radially toward the inside and radially toward the outside of the gap 53.

The plate 77 is typically a solid metal plate, attached on the end part 67 of the drive shaft. It extends substantially in a plane perpendicular to the rotation axis X. The plate 77 is a thin plate, having a small thickness along the axis X compared with its size perpendicular to the axis X.

Axially, it is located at a small distance from the thermally insulating partition 49, such that the passage pathway for the air, axially along the gap 53 then radially between the plate 77 and the thermally insulating partition 49, has only a reduced passage section.

The plate 77 is placed inside the cavity 21.

The coupling 15 is of any suitable type.

For example, the coupling is a gasket of the OLDHAM type, making it possible to thermally separate the drive shaft 9 from the motor shaft 13.

Such an OLDHAM gasket is for example described in document WO 2010/103249. It makes it possible to transmit the movement from the motor shaft to the drive shaft while absorbing the geometric variations of the kinematic chain, for example any misalignment of the shafts.

Such a gasket includes a driving plate 79 rigidly fastened to the drive shaft 13, a driven plate, which is the plate 77 in the illustrated example, and an intermediate plate 81 interposed between the plates 77 and 79.

The driving plate 79 rotates the intermediate plate 81 via periodic or linear contact zones. This rotational movement is transmitted from the intermediate plate 81 to the driven plate 77 also via periodic or linear contact zones.

The plates 77, 79 and 81 are parallel to one another, and typically perpendicular to the rotation axis X.

Resilient tabs formed in the plates 77, 79 and 81 allow resilient bearing of the plates against one another, axially. This results in pressing the sealing member 69 against the complementary sealing member 71, the steps 73 and 75 thus being urged against one another.

The operation of the valve will now be described.

The actuator 11, when it is necessary to move the flap 5, rotates the motor shaft 13. The rotational movement of the motor shaft 13 is transmitted to the drive shaft 9 by the coupling 15. The plate 77 turns with the drive shaft 9. It therefore remains constantly in line with the gap 53.

The drive shaft 13 is protected from the thermal radiation coming from the inlet and outlet ducts 23 and 25 by the angular sectors 27 and 29 of the side wall 19. It is protected from the thermal radiation coming from the valve body 3 by the thermally insulating partition 49. This partition also insulates the motor shaft 13 from the thermal radiation coming from the edge 39 of the side wall 19, welded on the valve body 3 and therefore heated by conduction by the valve body.

The heat transfers by convection from the valve body 3 to the motor shaft 13 are extremely reduced. The heated air in contact with the valve body 3 must first pass through the gap 53, then between the plate 77 and the thermally insulating partition 49. The passage section offered to the air is extremely reduced.

The plate 77 also forms a heat screen, in addition to the thermally insulating member 49.

The heat rising by conduction along the drive shaft 9 is conducted to the plate 77, where the large surface makes it possible to dissipate the heat. The air circulating between the inside and the outside of the cavity 21 through the openings 35 and 37 makes it possible to discharge the heat dissipated by the plate 77 to the outside of the cavity 21. The valve can have multiple variants.

It, for example, has a single plate 77, and not several plates 77, 79 and 81 parallel to one another.

In the example shown in FIGS. 1 and 3, the valve includes four plates; one plate 83 is inserted axially between the plate 79 and the actuator 11. In a variant, the valve includes any other number of plates: two, three, or more than four plates.

The presence of several plates makes it possible to improve the screen effect against radiation between the valve body 3 and the drive shaft 13. Furthermore, the circulation of hot gases optionally rising through the gap 53 in the cavity 21 is made more difficult by the presence of multiple plates.

In one advantageous variant shown in FIG. 3, the valve 1 includes a deflector 91 with a body 93 fastened to the end part 67 of the drive shaft 9 and a skirt 95 extending from the bottom 93 toward the valve body 3. The bottom 93 and the skirt 95 are solid surfaces.

The deflector 91 is thus in the shape of a concave bowl.

The skirt 95 surrounds the bearing 65 over its entire periphery, and is engaged in the gap 53. Thus, the exhaust gases rise from the inside of the valve body 3 along the drive shaft 9, are oriented by the deflector 91 toward the outside of the cavity 21, via the zone of the gap 53 located between the skirt 95 and the bearing 65.

Furthermore, the deflector 91 makes it possible to protect the bearing 65 from outside attacks, in particular projected solid materials.

It should be noted that this deflector 91 is optional in the invention.

According to one embodiment variant, the valve includes at least one additional insulating partition 97 (FIG. 6), housed in the cavity 21, interposed axially between the coupling 15 and the actuator 11. This additional insulating partition 97 is made like the insulating partition 49. It for example replaces the cover 43, It advantageously extends over practically the entire inner section of the side wall 19.

According to another embodiment variant, in the case where the valve 1 includes, in addition to the plate 77, at least one additional plate such as the plate 79 or the plate 81, arranged in the cavity 21, a crown is formed in the side wall 19.

The crown engaged between the plate 77 and the additional plate. Typically, a crown exists for each pair of plates housed in the cavity 21. Thus, hot air penetrating inside the cavity 21, to arrive at the motor shaft 13, must circulate in a baffle between the plates 77, 79, 81 and the crowns. This makes it possible to limit the heat transfers by convection towards the motor shaft 13.

Each crown extends over the entire perimeter of the side wall. It forms a reentrant collar, between the plates.

According to another embodiment variant, the valve 1 includes at least one air blower 101 or air extractor 103, connected to one of the openings 35, 37 of the side wall. This makes it possible to create a forced air circulation through the cavity 21, making it possible to discharge heat effectively.

Figure 4:
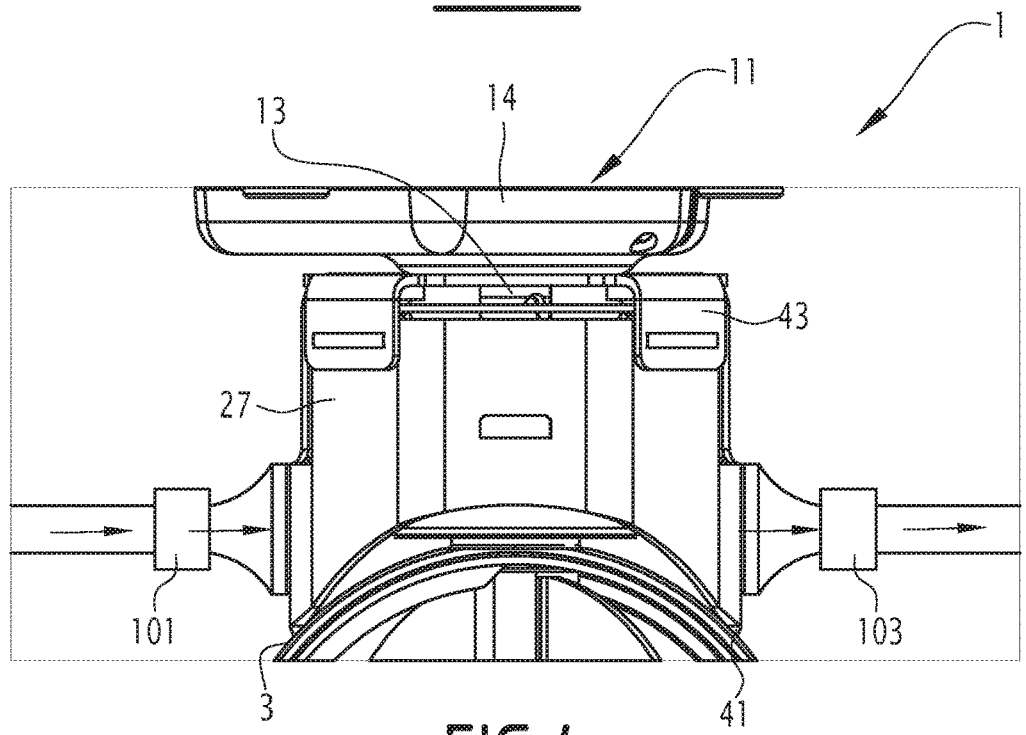
FIGS. 4 to 6 are sectional views, similar to the view of FIG. 3, showing three different embodiment variants of the invention.

This situation is shown in FIG. 4. The valve 1 normally includes only blowing 101 or extraction 103, but not both.

Figure 5:
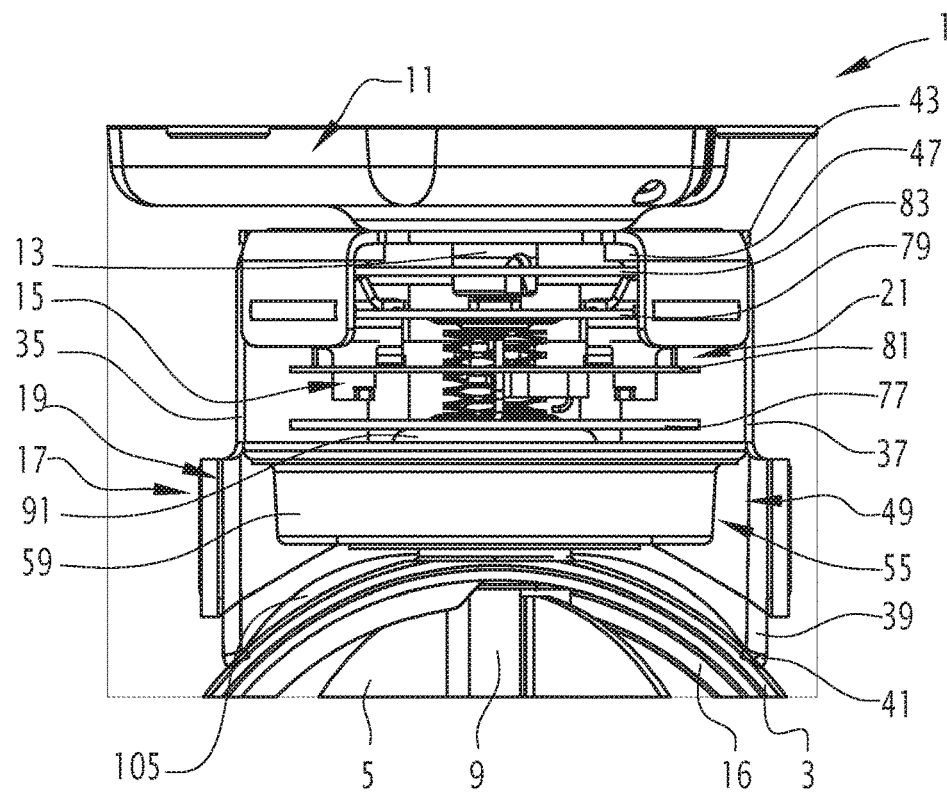

According to another embodiment variant, the valve 1 includes a layer 105 of a thermally insulating material, deposited on the valve body 3, inside the cavity 21 (FIG. 5). This layer 105 makes it possible to reduce the heat transfers by radiation and by convection. It preferably covers the entire zone of the valve body 3 located inside the cavity 21. It surrounds the bearing 65. It is made from any appropriate material.

According to another embodiment variant, the valve 1 includes a layer 107 of a thermally insulating material completely filling the volume of the cavity 21 between the thermally insulating partition 49 and the valve body 3. Thus, the entire volume defined between the thermally insulating partition, the valve body 3 and the side wall 19 is filled by the thermally insulating material. This makes it possible to obtain a particularly effective thermal insulation. The thermally insulating material is of any suitable type.

According to another embodiment variant, the deflector 91 comprises a collar 109 extending the skirt 95 and forming a heat screen between the valve body 3 and the insulating partition 49 (FIG. 6). The collar 109 is protruding, i.e., extends the skirt 95 radially outward.

According to still another embodiment variant, not shown, the thermally insulating partition may include several thin metal plates, superimposed on one another, optionally with an air knife separating the various plates.

According to still another embodiment variant, not shown, the side wall 19 is divided into two segments. The first segment is fastened by an axial end to the actuator 11, and by its opposite axial end to the thermally insulating partition 49. The second segment is fastened by an axial end to the thermally insulating partition 49 and by its opposite axial end to the valve body 3. Thus, the thermally insulating partition 49 is inserted axially between the two segments of the transverse wall.

According to another variant, the two segments of the side wall are fastened to one another. The thermally insulating partition is attached on one of the two segments, or is attached to the junction between the two segments.

According to still another embodiment variant, not shown, the drive shaft is hollow. This makes it possible to reduce the heat transfers by conduction along the drive shaft.

According to still another embodiment variant, not shown, the cover of the thermally insulating partition extends to the outside of the side wall, and constitutes a heat shield protecting the actuator from the thermal radiation emitted by the inlet duct and/or by the outlet duct.

The invention claimed is:

1. A valve for an exhaust line, the valve comprising:
a valve body having an exhaust gas inlet and an exhaust gas outlet;
a flap positioned in the valve body;
a first drive shaft secured to the flap and rotating relative to the valve body around a rotation axis;
an actuator having a second drive shaft;
a coupling that couples the second drive shaft and the first drive shaft;
a mounting of the actuator on the valve body including a side wall with a closed contour extending around the rotation axis and inwardly defining a cavity, the side wall being at least partially closed along angular sectors turned toward the exhaust gas inlet and toward the exhaust gas outlet, the side wall having at least one opening allowing air to circulate between an inside and an outside of the cavity;
at least one thermally insulating partition axially inserted between the valve body and the actuator, the at least one thermally insulating partition having a surface greater than 50% of an internal section of the cavity considered in a plane perpendicular to the rotation axis, the at least one thermally insulating partition having an opening in which the first drive shaft is engaged, with a gap separating the first drive shaft from an edge of the opening, and wherein the at least one thermally insulating partition is axially spaced apart from the valve body and has no direct contact with the valve body; and
a plate connected to the first drive shaft, axially inserted between the at least one thermally insulating partition and the actuator, and covering the gap.

2. The valve according to claim 1, wherein the actuator is situated at one axial end of the side wall, the second drive shaft being positioned in the cavity.

3. The valve according to claim 1, wherein the at least one thermally insulating partition and/or the plate is situated in the cavity.

4. The valve according to claim 1, wherein the at least one thermally insulating partition is substantially perpendicular to the rotation axis.

5. The valve according to claim 1, wherein the at least one thermally insulating partition comprises a metal outer enclosure and a layer of a fibrous material positioned inside the outer enclosure.

6. The valve according to claim 1, wherein the valve includes a bearing guiding the first drive shaft, engaged in the opening of the at least one thermally insulating partition, the gap separating the bearing from the edge of the opening, and wherein the bearing has a radially outer surface with the gap being delimited radially toward an outside by the edge of the opening and being delimited radially toward an inside by the radially outer surface of the bearing.

7. The valve according to claim 6, wherein the first drive shaft includes an end part protruding axially in the cavity past the bearing, the valve including a deflector with a bottom fastened to the end part and a skirt extending from the bottom toward the valve body, the skirt surrounding the bearing and being engaged in the gap.

8. The valve according to claim 7, wherein the deflector comprises a collar extending the skirt and forming a heat screen between the valve body and the at least one thermally insulating partition.

9. The valve according to claim 1, wherein the plate comprises a first plate, and wherein the valve includes at least one additional plate, positioned in the cavity and extending substantially parallel to the first plate.

10. The valve according to claim 1, wherein the valve includes at least one additional insulating partition, housed in the cavity, interposed axially between the coupling and the actuator.

11. The valve according to claim 1, wherein the valve includes a layer of a thermally insulating material extending over the valve body to the inside of the cavity.

12. The valve according to claim 1, wherein the valve includes a layer of a thermally insulating material completely filling a volume of the cavity between the at least one thermally insulating partition and the valve body.

13. The valve according to claim 1, wherein the valve includes at least one air blower or air extractor connected to the at least one of the side wall.

14. A vehicle exhaust line, including the valve according to claim 1.

15. The valve according to claim 1, wherein the at least one opening of the side wall comprises at least two openings allowing air to circulate between the inside and the outside of the cavity.

16. The valve according to claim 7, wherein the bottom and the skirt are solid surfaces, and the skirt surrounds the bearing over an entire periphery of the bearing.

17. The valve according to claim 16, wherein the bottom s axially between the bearing and the plate.

18. The valve according to claim 7, including a first sealing member rigidly fastened to the end part of the first drive shaft and a second sealing member associated with the bearing and that cooperates with the first sealing member to prevent exhaust gases from leaving the valve body by passing between the first drive shaft and the bearing.

19. The valve according to claim 18, wherein the first sealing member has a tapering sealing step surface bearing slidably against a complementary tapering sealing step surface formed on the second sealing member.

\* \* \* \* \*